US010983628B2

(12) United States Patent
Luo et al.

(10) Patent No.: US 10,983,628 B2
(45) Date of Patent: Apr. 20, 2021

(54) TOUCH MODULE, A METHOD FOR FABRICATING THE SAME, AND A TOUCH DISPLAY DEVICE

(71) Applicants: Chengdu BOE Optoelectronics Technology Co., Ltd., Chengdu (CN); BOE Technology Group Co., Ltd., Beijing (CN)

(72) Inventors: Hongqiang Luo, Beijing (CN); Qing Gong, Beijing (CN); Jianjun Wu, Beijing (CN); Chang Zhang, Beijing (CN); Feng Xiao, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 16/495,128

(22) PCT Filed: Apr. 4, 2019

(86) PCT No.: PCT/CN2019/081571
§ 371 (c)(1),
(2) Date: Sep. 18, 2019

(87) PCT Pub. No.: WO2020/010881
PCT Pub. Date: Jan. 16, 2020

(65) Prior Publication Data
US 2021/0026486 A1    Jan. 28, 2021

(30) Foreign Application Priority Data

Jul. 13, 2018    (CN) .......................... 201810769186.5

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 2203/04103* (2013.01)

(58) Field of Classification Search
CPC ................. G06F 3/0416; G06F 3/0446; G06F 2203/04103
See application file for complete search history.

(56) References Cited

U.S. PATENT DOCUMENTS 9,958,981 B2 *    5/2018  Yang ..................... G06F 3/0443
10,409,433 B2 *   9/2019  Kwak .................... G06F 3/0412
(Continued)

FOREIGN PATENT DOCUMENTS

CN    205193771 U    4/2016
CN    205281452 A    6/2016
(Continued)

OTHER PUBLICATIONS

Office Action for corresponding Chinese Application 201810769186.5 dated Sep. 4, 2019.

*Primary Examiner* — Amy Onyekaba
(74) *Attorney, Agent, or Firm* — Arent Fox LLP; Michael Fainberg

(57) ABSTRACT

This disclosure discloses a touch module, a method for fabricating the same, and a touch display device, and the touch module includes a touch area and a bezel area, and further includes: a first touch electrode structure located in the touch area, and configured to sense a touch signal in the touch area; a second touch electrode structure located in the bezel area, and configured to sense a touch signal in the bezel area; and the second touch electrode structure shares touch signal traveling lines with at least a part of the first touch electrode structure.

14 Claims, 7 Drawing Sheets

(56) References Cited

U.S. PATENT DOCUMENTS

| | | | |
|---|---|---|---|
| 10,671,226 B2 * | 6/2020 | Hayashi | G06F 3/04166 |
| 2013/0169567 A1 * | 7/2013 | Shih | G06F 3/041 345/173 |
| 2013/0181938 A1 * | 7/2013 | Takashima | G06F 3/0446 345/174 |
| 2014/0225843 A1 * | 8/2014 | Kuo | G06F 3/0412 345/173 |
| 2014/0354902 A1 * | 12/2014 | Shih | G06F 3/0446 349/12 |
| 2015/0109243 A1 * | 4/2015 | Jun | G06F 3/04886 345/174 |
| 2015/0234502 A1 * | 8/2015 | Kubo | G06F 3/03547 345/174 |
| 2015/0268797 A1 * | 9/2015 | Kurasawa | G06F 3/0412 345/174 |
| 2015/0346850 A1 * | 12/2015 | Vandermeijden | G06F 3/044 345/173 |
| 2016/0054828 A1 * | 2/2016 | Lien | G06F 3/0446 345/174 |
| 2016/0178974 A1 * | 6/2016 | Li | G02F 1/13458 345/174 |
| 2016/0187994 A1 * | 6/2016 | La | G06F 1/1677 345/619 |
| 2016/0218151 A1 * | 7/2016 | Kwon | H01L 27/3276 |
| 2016/0370904 A1 * | 12/2016 | Wang | G02F 1/1368 |
| 2016/0378240 A1 * | 12/2016 | Li | G06F 3/0412 345/174 |
| 2017/0131811 A1 * | 5/2017 | Watanabe | G06F 1/1643 |
| 2017/0228068 A1 * | 8/2017 | Pu | G06F 3/04164 |
| 2017/0285794 A1 * | 10/2017 | Tanemura | G06F 3/0446 |
| 2019/0034013 A1 * | 1/2019 | Hu | G06F 3/0446 |
| 2019/0041912 A1 * | 2/2019 | Ha | G06F 3/041 |
| 2019/0265832 A1 * | 8/2019 | Chan | G06F 3/044 |
| 2019/0369833 A1 * | 12/2019 | Kubo | G06F 3/04164 |
| 2020/0019282 A1 | 1/2020 | Luo et al. | |
| 2020/0233530 A1 * | 7/2020 | Xie | G06F 3/044 |

FOREIGN PATENT DOCUMENTS

| | | | |
|---|---|---|---|
| CN | 205899517 U | | 1/2017 |
| CN | 107450775 A | * | 12/2017 |
| CN | 107450775 A | | 12/2017 |
| CN | 108958562 A | | 12/2018 |
| CN | 108984033 A | | 12/2018 |
| KR | 20150078764 A | | 7/2015 |

\* cited by examiner

TOUCH MODULE, A METHOD FOR FABRICATING THE SAME, AND A TOUCH DISPLAY DEVICE

This application is a national stage of International Application No. PCT/CN2019/081571, filed on Apr. 4, 2019, claiming priority to Chinese Patent Application No. 201810769186.5 filed with the Chinese Patent Office on Jul. 13, 2018, and entitled "A touch module, a touch display device, and a method for fabricating the same", the contents of each of which are hereby incorporated by reference in their entireties.

FIELD

This disclosure generally relates to the field of touch technologies, and particularly to a touch module, a method for fabricating the same, and a touch display device.

BACKGROUND

The existing mobile phone, tablet computer, and other electronic devices typically include a touch display screen, and a physical control button with a specific function is arranged on one side of these electronic devices to control volume, to power on or off the devices, and to perform other functions.

The existing touch screen includes a resistive touch screen or a capacitive touch screen dependent upon the induction principles thereof. The capacitive touch screen with a higher penetrability has been more favored in smart mobile phones than the resistive touch screen. However, the existing touch screen is generally designed to sense an input signal in a single plane due to its durability, stability and other factors.

SUMMARY

An embodiment of this disclosure provides a touch module including a touch area and a bezel area, the touch module further including: a first touch electrode structure located in the touch area, and configured to sense a touch signal in the touch area; a second touch electrode structure located in the bezel area, and configured to sense a touch signal in the bezel area; and the second touch electrode structure sharing touch signal traveling lines with at least a part of the first touch electrode structure.

Optionally in an embodiment of this disclosure, the first touch electrode structure includes first touch sense electrodes and first touch scan electrodes arranged to intersect with and to be insulated from each other; and the second touch electrode structure includes: a second touch sense electrode formed by the first touch sense electrodes located at an edge of the touch area and extending to the bezel area, and a second touch scan electrode formed by the first touch scan electrodes located at the edge of the touch area and extending to the bezel area.

Optionally in an embodiment of this disclosure, the second touch electrode structure includes the second touch sense electrode formed by one first touch sense electrode extending to the bezel area, and at least two second touch scan electrodes formed by at least two first touch scan electrodes adjacent to the first touch sense electrode, which extend respectively to the bezel area.

Optionally in an embodiment of this disclosure, the second touch sense electrode includes a first extension section and a first branch section intersecting and connected with each other; and the first extension section is connected with the first touch sense electrode.

Optionally in an embodiment of this disclosure, both the first touch sense electrodes and the first touch scan electrodes include a plurality of block electrodes shaped like a diamond; and the first extension section and the first branch section constitute the second touch sense electrode of T-shape.

Optionally in an embodiment of this disclosure, the respective second touch scan electrodes are parallel to the first branch section.

Optionally in an embodiment of this disclosure, the second touch electrode structure includes the second touch scan electrode formed by one first touch scan electrode extending to the bezel area, and at least two second touch sense electrodes formed by at least two first touch sense electrodes adjacent to the first touch scan electrode, which extend respectively to the bezel area.

Optionally in an embodiment of this disclosure, the second touch scan electrode includes a third extension section and a second branch section intersecting and connected with each other; and the third extension section is connected with the first touch scan electrode.

Optionally in an embodiment of this disclosure, both the first touch sense electrodes and the first touch scan electrodes include a plurality of block electrodes shaped like a diamond; and the third extension section and the second branch section constitute the second touch scan electrode of T-shape.

Optionally in an embodiment of this disclosure, the respective second touch sense electrodes are parallel to the second branch section.

Optionally in an embodiment of this disclosure, the touch signal traveling lines include first traveling lines connected with the first touch electrodes, and second traveling lines connected with the second touch electrodes; the second touch scan electrode shares the first traveling lines with the first touch scan electrodes; and the second touch sense electrode shares the second traveling lines with the first touch sense electrodes.

Optionally in an embodiment of this disclosure, the touch module above further includes an underlying substrate, wherein: there is a specified angle between a part of the underlying substrate corresponding to the touch area, and a part of the underlying substrate corresponding to the bezel area.

Correspondingly, an embodiment of this disclosure further provides a touch display device including the touch module above, wherein the touch display device further includes a display area located in the touch area of the touch module.

Optionally in an embodiment of this disclosure, the touch display device includes virtual touch buttons including at least one second touch electrode structure.

Correspondingly an embodiment of this disclosure further provides a method for fabricating the touch module above, the method including: forming the first touch electrode structure in the touch area, wherein the first touch electrode structure is configured to sense a touch signal in the touch area; and forming the second touch electrode structure in the bezel area, wherein the second touch electrode structure is configured to sense a touch signal in the bezel area, wherein: the second touch electrode structure and at least a part of the first touch electrode structure are connected with the same touch signal traveling lines.

DETAILED DESCRIPTION OF THE EMBODIMENTS

Figure 1:
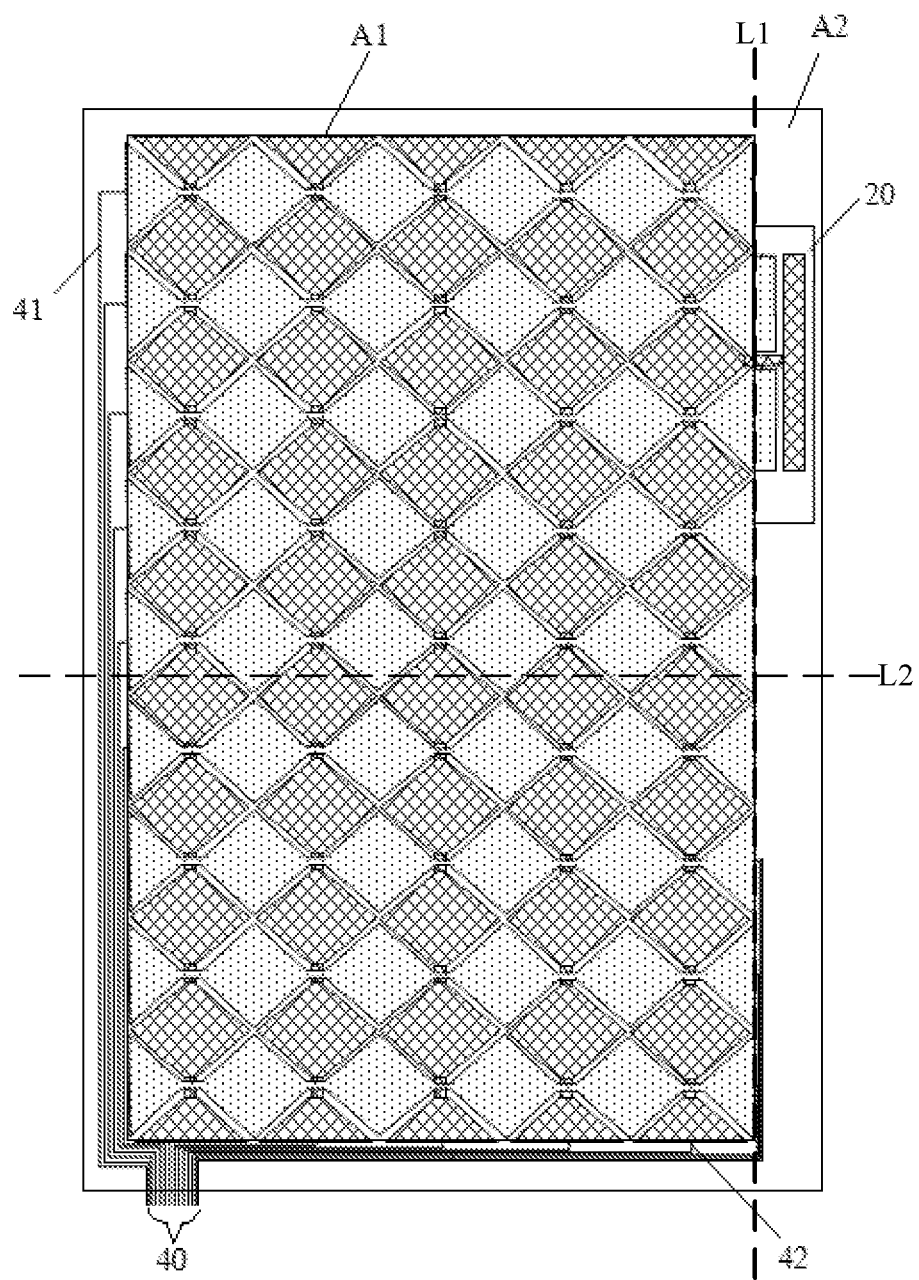
FIG. 1 is a schematic structural diagram of a touch module according to an embodiment of this disclosure.

This disclosure will be described below in further details with reference to the drawings and embodiments thereof. As can be appreciated, the particular embodiments described here are only intended to set forth this disclosure, but not to limit this disclosure thereto. It shall be further noted that only components related to this disclosure are illustrated in the drawings for the sake of a convenient description.

It shall be noted that the embodiments of this disclosure, and the features in the embodiments can be combined with each other unless they conflict with each other. This disclosure will be described below in details with reference to the drawings and in connection with the embodiments thereof.

Figure 2:
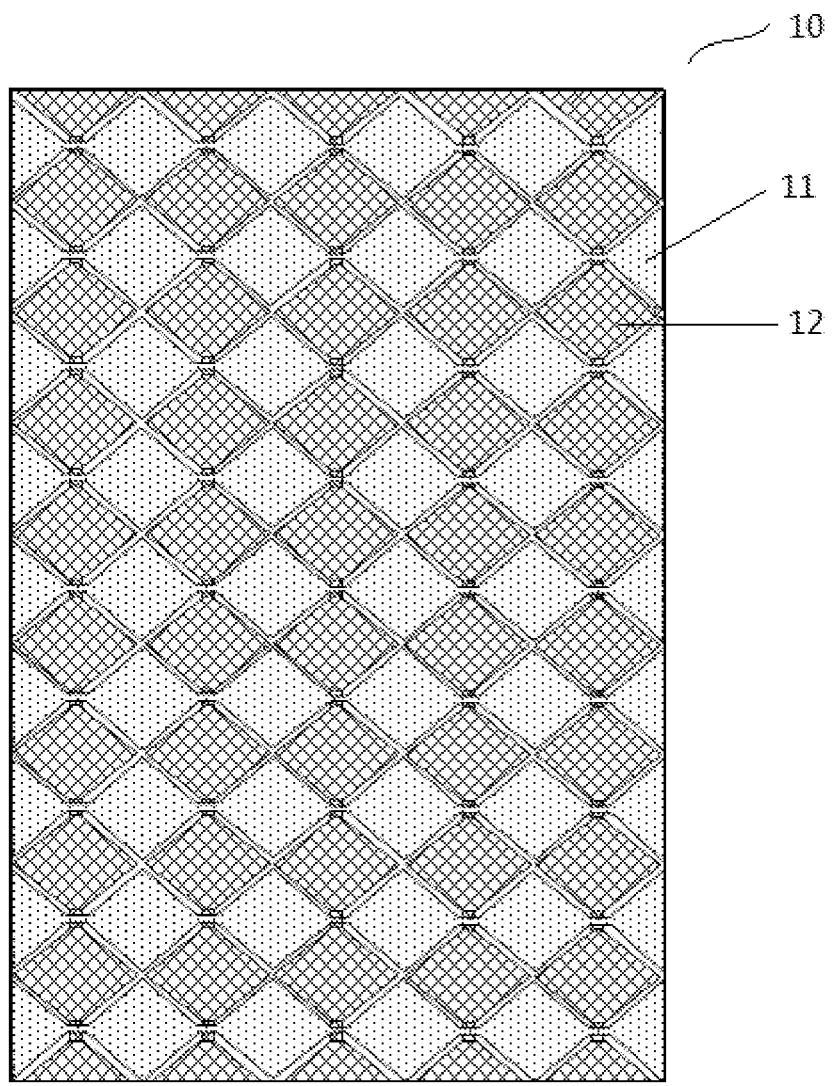
FIG. 2 is a schematic structural diagram of a first touch electrode structure according to an embodiment of this disclosure.
Figure 3:
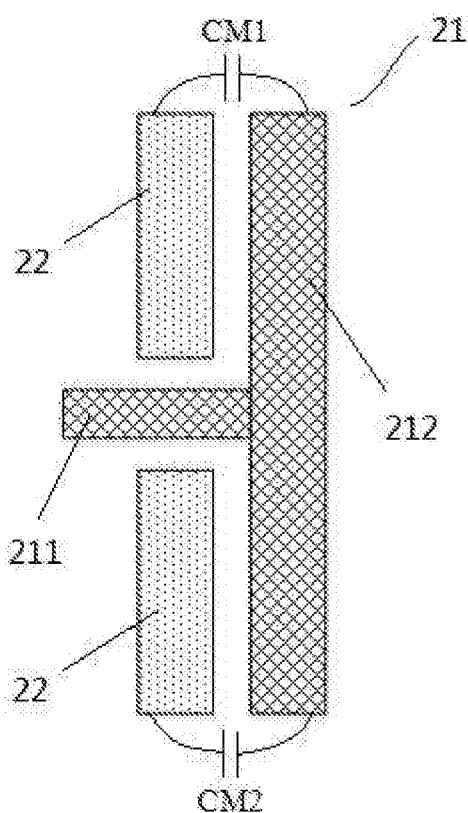
FIG. 3 is a schematic structural diagram of a second touch electrode structure according to an embodiment of this disclosure.

As illustrated in FIG. 1 to FIG. 3, FIG. 1 is a schematic structural diagram of a touch module according to an embodiment of this disclosure, FIG. 2 is a schematic structural diagram of a first touch electrode structure according to an embodiment of this disclosure, and FIG. 3 is a schematic structural diagram of a second touch electrode structure according to an embodiment of this disclosure.

As illustrated, an embodiment of this disclosure provides a touch module including a touch area A1 and a bezel area A2. The dotted line L1 as illustrated represents a boundary between the touch area A1 and the bezel area A2, that is, the touch area A1 and the bezel area A2 intersect with each other at the dotted line L1. The touch module further includes: a first touch electrode structure 10 located in the touch area A1, and configured to sense a touch signal in the touch area A1; a second touch electrode structure 20 located in the bezel area A2, and configured to sense a touch signal in the bezel area A2. The second touch electrode structure 20 shares touch signal traveling lines 40 with at least a part of the first touch electrode structure 10.

In an embodiment of this disclosure, the second touch electrode structure 20 can be arranged in the bezel area A2 to thereby design virtual buttons instead of original physical buttons with a specified control function so as to advantageously save a space and a cost. Moreover, the second touch electrode structure and the first touch electrode structure can share the touch signal traveling lines to thereby simplify the structure by designing the virtual touch buttons without increasing the area of the bezel area of the touch module, and the number of touch signal traveling lines.

In the touch module according to an embodiment of this disclosure, touch signals can be sensed in the touch area and the bezel area in different planes. For example, in order to configure the touch module for a mobile phone, the second touch electrode structure can be arranged on one side of the mobile phone instead of the existing physical buttons, e.g., a volume control button, a power button, etc., to thereby improve the experience of a user, and save a space. It shall be noted that the corresponding touch area and bezel area may not be planar structures, but may be curved surfaces with some arc, although an embodiment of this disclosure will not be limited thereto.

In a particular implementation, the touch signal traveling lines can be arranged at the edge of the touch area A1, or can be arranged in the bezel area A2, to thereby improve a screen to panel ratio of the touch display device so as to improve touch and display effects.

Particularly in an embodiment of this disclosure, as illustrated in FIG. 2, the first touch electrode structure 10 includes first touch sense electrodes 12 and first touch scan electrodes 11 arranged to intersect with and to be insulated from each other.

As illustrated in FIG. 3, the second touch electrode structure 20 includes: a second touch sense electrode 21 formed by the first touch sense electrode 12 located at the edge of the touch area A1 and extending to the bezel area A2, and second touch scan electrodes 22 formed by the first touch scan electrodes 11 located at the edge of the touch area A1 and extending to the bezel area.

The second touch electrode structure in an embodiment of this disclosure includes a part of the extending first touch electrode structure to thereby simplify the structure by enabling the second touch electrode structure to sense a touch signal without increasing the number of touch signal traveling lines.

As illustrated in FIG. 2, in some embodiment of this disclosure, the first touch sense electrodes 12 and the first touch scan electrodes 11 in the first touch electrode structure 10 can be located at the same layer, connection bridges can be arranged at the positions where the first touch sense electrodes 12 intersect with the first touch scan electrodes 11, and the first touch sense electrodes 12 can be insulated from the first touch scan electrodes 11 at the positions of the connection bridges. Particularly the first touch sense electrodes 12 and the first touch scan electrodes 11 can include a plurality of block electrodes respectively, and the block electrodes can be shaped like a diamond or in another shape. As illustrated in FIG. 2, the first touch sense electrodes 12 can include a plurality of block electrodes connected by a plurality of wires located at the same layer, and the first touch scan electrodes 11 can include a plurality of block electrodes connected by a plurality of connection bridges. For the sake of a convenient description of the positional relationship between the first touch scan electrodes 11 and the second touch sense electrodes 12, the first touch scan electrodes 11 and the second touch sense electrodes 12 are located at the same layer in an embodiment of this disclosure as illustrated by way of an example; or in a particular implementation, the first touch scan electrodes 11 and the second touch sense electrodes 12 can alternatively be located respectively at two layers insulated from each other, although an embodiment of this disclosure will not be limited thereto.

Since the first touch scan electrodes 11 and the second touch sense electrodes 12 in the first touch electrode structure 10 are arranged to intersect with each other, a touch position can be determined by detecting a change in capacitance at the intersections to thereby detect a touch. While a finger is touching, a mutual capacitance at a corresponding position is decreased, and particularly while the finger is touching, capacitances of a plurality of groups of touch electrodes around the position where the finger touches are changed. There is the largest change in capacitances of touch electrodes at the central position touched by the finger, and a touch detection circuit can determine the position of the touching finger by analyzing the distribution of a plurality of sets of changes in capacitances.

Alike as illustrated in FIG. 3, the second touch sense electrode 21 and the second touch scan electrodes 22 in the second touch electrode structure constitute capacitors CM1 and CM2. While the finger of the user is touching the bezel area, the touch electrodes with the largest change in capacitances are located in the bezel area, and there are also some changes in capacitances of the corresponding touch electrodes proximate to the bezel area, so the touch detection circuit can determine the position of the touching finger according to the distribution of the respective changes in capacitances.

While the finger is touching the touch area of the common touch signal traveling lines, the position with the largest change in capacitance is changed, and changes in capacitances of the touch electrodes proximate to the position are also changed, so the touch detection circuit can determine the position of the touching finger according to the distribution of the respective changes in capacitances. In this way, even if the touch signal traveling lines are shared, then the particular position of the touch may be recognized according to the distribution of the changes in capacitances of the touch electrodes.

In some embodiment, as illustrated in FIG. 1, FIG. 2, and FIG. 3, the second touch electrode structure 20 includes the second touch sense electrode 21 formed by one first touch sense electrode 12 extending to the bezel area A2, and at least two second touch scan electrodes 22 formed by at least two first touch scan electrodes 11 adjacent to the first touch sense electrode 12, which extend respectively to the bezel area. As illustrated, the second touch electrode structure 20 includes two second touch scan electrodes 22 formed by two first touch scan electrodes 11 extending to the bezel area A2; and in a particular implementation, the number of second touch scan electrodes 22 in the second touch electrode structure may alternatively be three, four, or another number, although an embodiment of this disclosure will not be limited thereto.

In order not to introduce additional traveling lines, a part of the first touch sense electrodes 12, and a part of the first touch scan electrodes 11, located at the edge of the touch area A1, in the first touch electrode structure extend directly to the bezel area A2 to form a different distribution of mutual capacitors from the first touch electrode structure so that there is a different capacitance in the second touch electrode structure from those in the first touch electrode structure, so when there is an external object pressing, the position of the pressing can be determined according to different capacitances in the first touch electrode structure and the second touch electrode structure.

Particularly in an embodiment of this disclosure, as illustrated in FIG. 1, the touch signal traveling lines include first traveling lines 41 connected with the first touch scan electrodes 11, and second traveling lines 42 connected with the first touch sense electrodes 12.

The second touch scan electrodes 22 share the first traveling lines 41 with the first touch scan electrodes 11.

The second touch sense electrode 21 shares the second traveling lines 42 with the first touch sense electrodes 12.

It shall be noted that an arrangement area of the touch signal traveling lines 40 will not be limited to any particular arrangement area, but can alternatively be arranged in the touch area or another area as needed. For example, the first traveling lines 41 and the second traveling lines 42 can be arranged at the edge of the touch area A1, or a part or all of them can be arranged in the bezel area A2, as needed in reality. The second touch sense electrode 21 can share the second traveling lines 42 with the first touch sense electrodes 12 extending and connected therewith, and the second touch scan electrodes 22 can share the first traveling lines 41 with the first touch scan electrodes 11 extending and connected therewith, to thereby simplify the structure of the touch module, and detect a touch in the bezel area without increasing the number of touch signal traveling lines in the touch module.

In some embodiment of this disclosure, as illustrated in FIG. 3, the second touch sense electrode 21 includes a first extension section 211 and a first branch section 212 intersecting and connected with each other.

The first extension section 211 is connected with the first touch sense electrodes.

In a particular implementation, both the first touch sense electrodes 12 and the first touch scan electrodes 11 include a plurality of block electrodes shaped like a diamond.

The first extension section 211 and the first branch section 212 constitute the second touch sense electrode of T-shape 21, that is, the first extension section 211 may or may not be perpendicular to the first branch section 212, and the angle between the first extension section 211 and the first branch section 212 will not be limited to any particular angle.

As can be appreciated, the first extension section 211 is connected with the first branch section 212, and both of them are extensions of the first touch sense electrodes 12.

In some embodiment of this disclosure, the respective second touch scan electrodes 22 are parallel to the first branch section 212 so that the second touch scan electrodes 22 and the first branch section 212 constitute a mutual-capacitive structure to thereby facilitate detection of a touch position, and wiring.

It shall be noted that as illustrated in FIG. 3, for a second touch electrode structure, the first branch section 212, and two second touch scan electrodes 22 respectively form the mutual capacitors CM1 and CM2. In a real detection process, the particular position of a touch can be determined according to the changes in capacitances of the capacitors CM1 and CM2.

Figure 4:
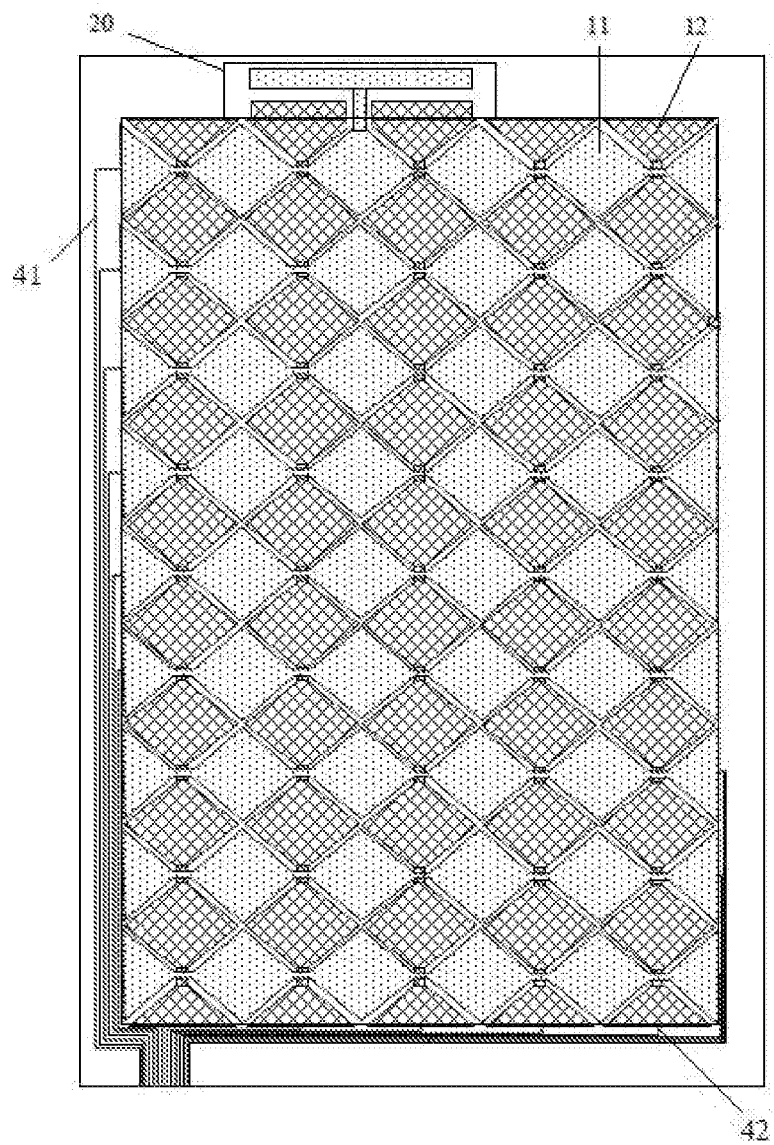
FIG. 4 is another schematic structural diagram of the touch module according to an embodiment of this disclosure.
Figure 5:
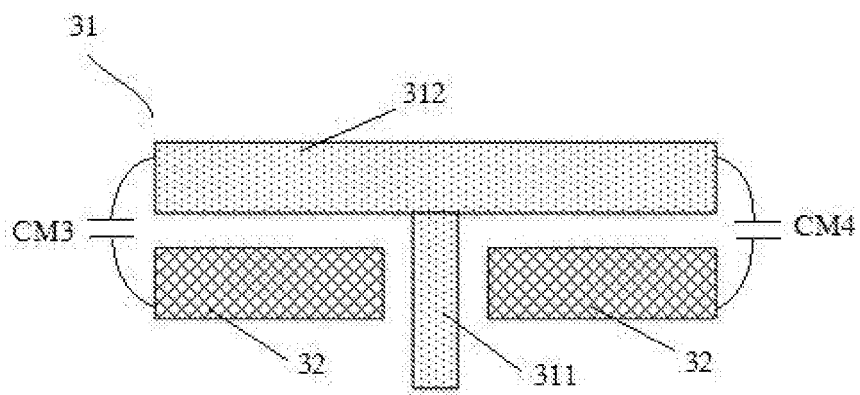
FIG. 5 is another schematic structural diagram of the second touch electrode structure according to an embodiment of this disclosure.

As illustrated in FIG. 4 and FIG. 5, FIG. 4 is another schematic structural diagram of the touch module according to an embodiment of this disclosure, and FIG. 5 is another schematic structural diagram of the second touch electrode structure according to an embodiment of this disclosure.

In some embodiment of this disclosure, the second touch electrode structure 20 includes a second touch scan electrode 31 formed by one first touch scan electrode 11 extending to the bezel area, and at least two second touch sense electrodes 32 formed by at least two first touch sense electrodes 12 adjacent to the first touch scan electrode 11, which extend respectively to the bezel area.

In some embodiment of this disclosure, the second touch scan electrode 31 includes a third extension section 311 and a second branch section 312 intersecting and connected with each other.

The third extension section 311 is connected with the first touch scan electrode.

In a particular implementation, both the first touch sense electrodes 12 and the first touch scan electrodes 11 include a plurality of block electrodes shaped like a diamond.

The third extension section 311 and the second branch section 312 constitute the second touch scan electrode of T-shape 31, that is, the third extension section 311 may or may not be perpendicular to the second branch section 312, and the angle between the third extension section 311 and the second branch section 312 will not be limited to any particular angle.

In some embodiment of this disclosure, the respective second touch sense electrodes 32 are parallel to the second branch section 312.

It shall be noted that as illustrated in FIG. 5, for a second touch electrode structure, the second branch section 312, and two second touch sense electrodes 32 respectively form mutual capacitors CM3 and CM4.

Figure 6:
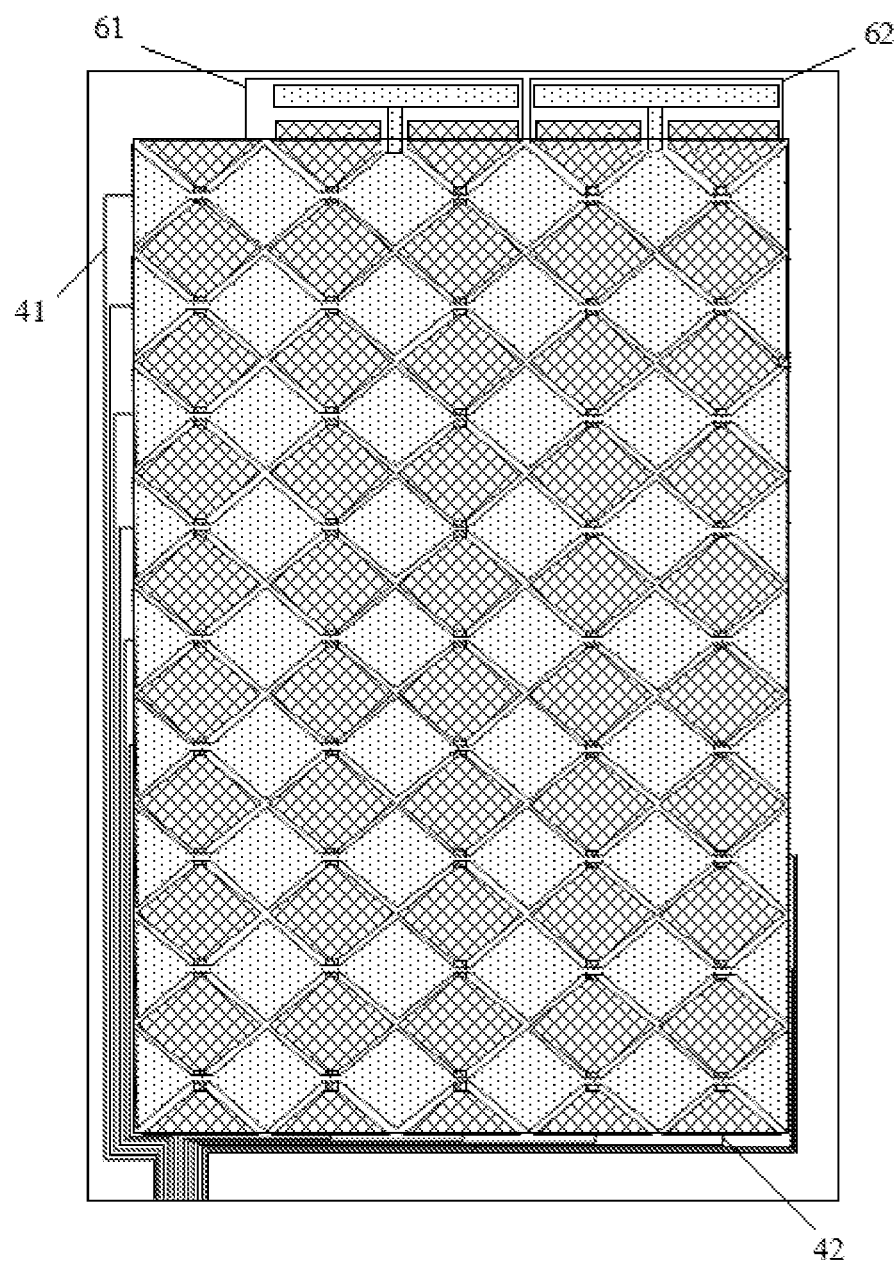
FIG. 6 is a schematic structural diagram of a touch module including second touch electrode structures arranged consecutively according to an embodiment of this disclosure.

FIG. 6 is a schematic structural diagram of a touch module including second touch electrode structures arranged consecutively according to an embodiment of this disclosure. As illustrated in FIG. 6, the respective second touch electrode structures are arranged consecutively. FIG. 6 only illustrates an example in which two second touch electrode structures 62 and 61 are arranged consecutively, but in a real application, a plurality of second touch electrode structures can be arranged consecutively.

Figure 7:
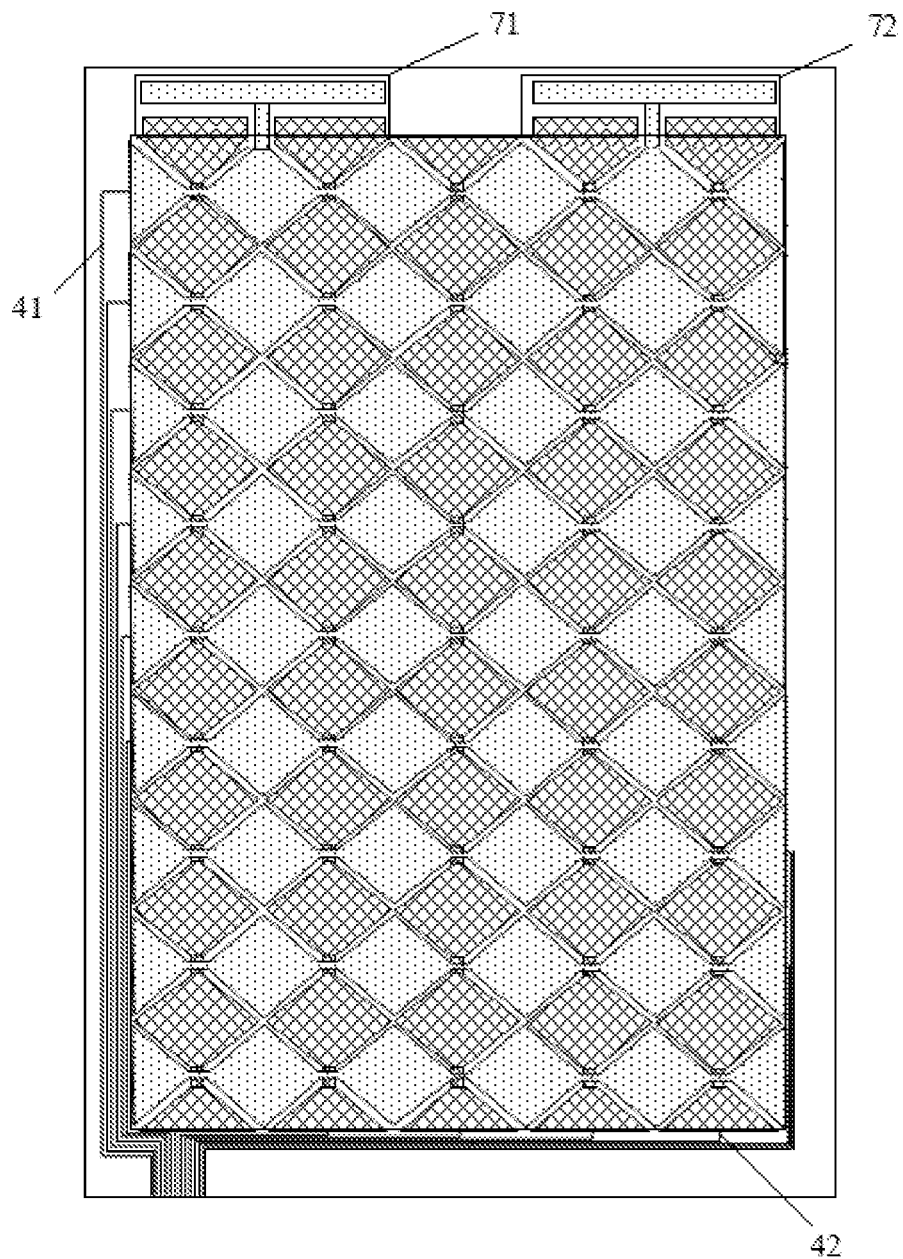
FIG. 7 is a schematic structural diagram of a touch module including second touch electrode structures arranged at an interval according to an embodiment of this disclosure.

FIG. 7 is a schematic structural diagram of a touch module including second touch electrode structures arranged at an interval according to an embodiment of this disclosure. As illustrated in FIG. 7, the respective second touch electrode structures are arranged at an interval. FIG. 7 only illustrates an example in which two second touch electrode structures 71 and 72 are arranged at an interval, but in a real application, a plurality of second touch electrode structures can be arranged at an interval as needed, and the spacing between adjacent second touch electrode structures can be set reasonably as needed in reality.

Figure 8:
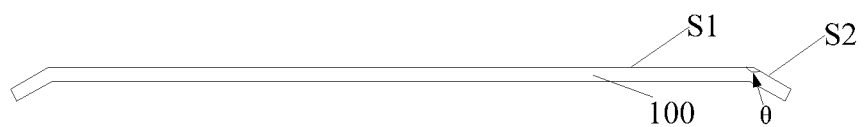
FIG. 8 is a schematic diagram of the touch module in FIG. 1 in a sectional view along a dotted line L2.

FIG. 8 is a schematic diagram of the touch module in FIG. 1 in a sectional view along the dotted line L2. As illustrated in FIG. 8, in some embodiment of this disclosure, the touch module above further includes an underlying substrate 100.

There is a specified angle between a part of the underlying substrate 100 corresponding to the touch area, and a part the underlying substrate 100 corresponding to the bezel area.

As illustrated in FIG. 8, the underlying substrate 100 can include a first surface S1 and at least one second surface S2 adjacent to the first surface S1. There is a specified angle (e.g., the angle θ in FIG. 2) between the first surface S1 and the second surface S2. The part of the underlying substrate 100 corresponding to the touch area can be arranged on the first surface S1, and the part of the underlying substrate 100 corresponding to the bezel area can be arranged on the second surface S2, so that touch signals can be detected in the display area and the bezel area in different planes.

For example, when the touch module is configured for a mobile phone, the second touch electrode structure can be arranged on one side of the mobile phone instead of the existing physical buttons, e.g., a volume control button, a power button, etc., to thereby improve the experience of a user, and save a space. It shall be noted that the corresponding touch area and bezel area may not be planar structures, but may be curved surfaces with some arc, although an embodiment of this disclosure will not be limited thereto.

Correspondingly an embodiment of this disclosure further provides a touch display device including the touch module according to any one of the embodiments above of this disclosure.

The touch area of the touch module can correspond to a display face of the touch display device, and the bezel area of the touch module can correspond to a face where a side of the touch display device is located.

For example, when the touch display device is configured as a mobile phone, the second touch electrode structure can be arranged on one side of the mobile phone instead of the existing physical buttons, e.g., a volume control button, a power button, etc., to thereby improve the experience of a user, and save a space. It shall be noted that the corresponding touch area and bezel area may not be planar structures, but may be curved surfaces with some arc, although an embodiment of this disclosure will not be limited thereto.

Optionally in some embodiment of this disclosure, the touch display device above includes a display area.

The display area is located in the touch area of the touch module.

In this way, a touch function can also be performed in the display area of the touch display device, or the touch area of the touch module can alternatively be arranged at another position as needed in reality, and the positional relationship between the display area and the touch area will not be limited to any particular positional relationship.

In some embodiment of this disclosure, the touch display device includes at least one virtual touch button.

The at least one virtual touch button includes at least one second touch electrode structure.

In a particular implementation, the second touch electrode structures can be arranged consecutively or at an interval as illustrated in FIG. 6 or FIG. 7 as needed for a different layout of buttons.

Correspondingly an embodiment of this disclosure further provides a method for fabricating the touch module, where the method includes the steps of: forming the first touch electrode structure in the touch area, where the first touch electrode structure is configured to sense a touch signal in the touch area; and forming the second touch electrode structure in the bezel area, where the second touch electrode structure is configured to sense a touch signal in the bezel area. The second touch electrode structure and at least a part of the first touch electrode structure are connected with the same touch signal traveling lines.

In an embodiment of this disclosure, the second touch electrode structure can be arranged in the bezel area to thereby design a virtual keyboard including virtual buttons.

Moreover the second touch electrode structure and at least a part of the first touch electrode structure can be connected with the same touch signal traveling lines to thereby design the virtual touch buttons without increasing the area of the bezel area of the touch module, and the number of touch signal traveling lines.

In some embodiment of this disclosure, the touch module is formed on an underlying substrate. There is a specified angle between a part of the underlying substrate corresponding to the touch area, and a part of the underlying substrate corresponding to the bezel area, so that touch signals can be sensed in the touch area and the bezel area in different planes.

The foregoing description is only illustrative of embodiments of the disclosure, and their technical principle. Those skilled in the art can appreciate that the disclosure of the disclosure will not be limited to the technical solution including the specific combination of the technical features above, and shall cover the other technical solutions including any combination of the technical features above or their equivalent features without departing from the scope of this disclosure, e.g., technical solutions including the technical features above replacing the technical features, with functions similar thereto, as disclosed in the context (without any limitation thereto), or the latter technical features replacing the former technical features.

Although the preferable embodiments of this disclosure have been described, those skilled in the art can make additional modifications and changes to these embodiments without departing from their underlying inventive ideas. Accordingly, the appended claims are intended to cover the preferable embodiments, and all the modifications and changes falling into the scope of this disclosure.

The invention claimed is:

1. A touch module, comprising a touch area and a bezel area, the touch module further comprising:
    a first touch electrode structure located in the touch area, and configured to sense a touch signal in the touch area;
    a second touch electrode structure located in the bezel area, and configured to sense a touch signal in the bezel area; and
    the second touch electrode structure sharing touch signal traveling lines with at least a part of the first touch electrode structure;
    wherein the first touch electrode structure comprises first touch sense electrodes and first touch scan electrodes arranged to intersect with and to be insulated from each other;
    the touch signal traveling lines comprise first traveling lines connected with the first touch sense electrodes, and second traveling lines connected with the first touch scan electrodes;
    the second touch electrode structure comprises:
        at least one second touch sense electrode each formed by a respective one of the first touch sense electrodes located at an edge of the touch area and extending to the bezel area, both the each second touch sense electrode and the respective one first touch sense electrode being connected directly with a same first traveling line, the each second touch sense electrode and the respective one first touch sense electrode being of different shapes; and
        at least one second touch scan electrode each formed by a respective one of the first touch scan electrodes located at the edge of the touch area and extending to the bezel area, both the each second touch scan electrode and the respective one first touch scan electrode being connected directly with a same second traveling line, the each second touch scan electrode and the respective one first touch scan electrode being of different shapes.

2. The touch module according to claim 1, wherein the second touch electrode structure comprises one second touch sense electrode formed by one first touch sense electrode extending to the bezel area, and two second touch scan electrodes formed by two first touch scan electrodes adjacent to the one first touch sense electrode, which extend respectively to the bezel area.

3. The touch module according to claim 2, wherein the one second touch sense electrode comprises a first extension section and a first branch section intersecting and connected with each other; and
    the first extension section is connected with the one first touch sense electrode.

4. The touch module according to claim 3, wherein both the first touch sense electrodes and the first touch scan electrodes comprise a plurality of block electrodes shaped like a diamond; and
    the first extension section and the first branch section constitute the one second touch sense electrode of T-shape.

5. The touch module according to claim 3, wherein the respective second touch scan electrodes are parallel to the first branch section.

6. The touch module according to claim 1, wherein the second touch electrode structure comprises one second touch scan electrode formed by one first touch scan electrode extending to the bezel area, and two second touch sense electrodes formed by two first touch sense electrodes adjacent to the one first touch scan electrode, which extend respectively to the bezel area.

7. The touch module according to claim 6, wherein the one second touch scan electrode comprises a third extension section and a second branch section intersecting and connected with each other; and
    the third extension section is connected with the one first touch scan electrode.

8. The touch module according to claim 7, wherein both the first touch sense electrodes and the first touch scan electrodes comprise a plurality of block electrodes shaped like a diamond; and
    the third extension section and the second branch section constitute the one second touch scan electrode of T-shape.

9. The touch module according to claim 7, wherein the respective second touch sense electrodes are parallel to the second branch section.

10. The touch module according to claim 1, wherein the touch module above further comprises an underlying substrate, wherein:
    there is a specified angle between a part of the underlying substrate corresponding to the touch area, and a part of the underlying substrate corresponding to the bezel area.

11. A touch display device, comprising a touch module, the touch module comprising a touch area and a bezel area, the touch module further comprising:
    a first touch electrode structure located in the touch area, and configured to sense a touch signal in the touch area;
    a second touch electrode structure located in the bezel area, and configured to sense a touch signal in the bezel area; and
    the second touch electrode structure sharing touch signal traveling lines with at least a part of the first touch electrode structure;
    wherein the first touch electrode structure comprises first touch sense electrodes and first touch scan electrodes arranged to intersect with and to be insulated from each other;
    the touch signal traveling lines comprise first traveling lines connected with the first touch sense electrodes, and second traveling lines connected with the first touch scan electrodes;
    the second touch electrode structure comprises:
        at least one second touch sense electrode each formed by a respective one of the first touch sense electrodes located at an edge of the touch area and extending to the bezel area, both the each second touch sense electrode and the respective one first touch sense electrode being connected directly with a same first traveling line, the each second touch sense electrode and the respective one first touch sense electrode being of different shapes; and at least one second touch scan electrode each formed by a respective one of the first touch scan electrodes located at the edge of the touch area and extending to the bezel area, both the each second touch scan electrode and the respective one first touch scan electrode being connected directly with a same second traveling line, the each second touch scan electrode and the respective one first touch scan electrode being of different shapes;

wherein the touch display device further comprises a display area located in the touch area of the touch module.

12. The touch display device according to claim 11, wherein the touch display device comprises virtual touch buttons comprising at least one second touch electrode structure.

13. A method for fabricating the touch module according to claim 1, the method comprising:

forming the first touch electrode structure in the touch area, wherein the first touch electrode structure is configured to sense a touch signal in the touch area; and forming the second touch electrode structure in the bezel area, wherein the second touch electrode structure is configured to sense a touch signal in the bezel area, wherein:

the second touch electrode structure and at least a part of the first touch electrode structure are connected with the same touch signal traveling lines.

14. A touch module, comprising a touch area and a bezel area, the touch module further comprising:

a first touch electrode structure located in the touch area, and configured to sense a touch signal in the touch area;

a second touch electrode structure located in the bezel area, and configured to sense a touch signal in the bezel area; and the second touch electrode structure sharing touch signal traveling lines with the first touch electrode structure;

wherein the first touch electrode structure comprises first touch sense electrodes and first touch scan electrodes arranged to intersect with and to be insulated from each other; and the second touch electrode structure consists of: one second touch scan electrode formed by one first touch scan electrode located at an edge of the touch area and extending to the bezel area, and two second touch sense electrodes formed by two first touch sense electrodes located at the edge of the touch area adjacent to the one first touch scan electrode, which extend respectively to the bezel area;

wherein the one second touch scan electrode comprises a third extension section and a second branch section intersecting and connected with each other;

the third extension section is connected with the one first touch scan electrode; and the respective second touch sense electrodes are parallel to the second branch section.

* * * * *